H. ROSENBERG.
DAMPER APPARATUS.
APPLICATION FILED MAY 19, 1919.
1,326,096. Patented Dec. 23, 1919.
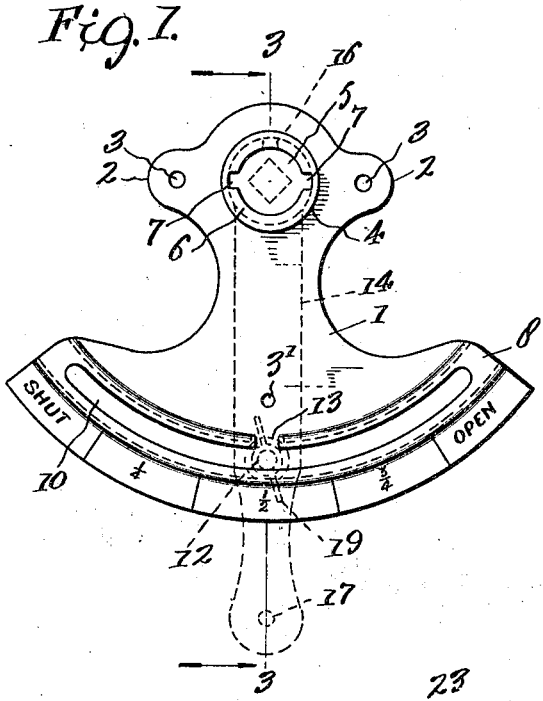
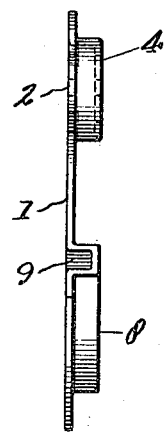
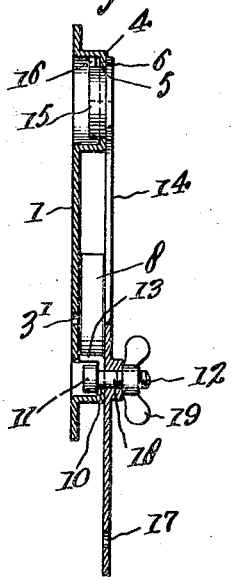
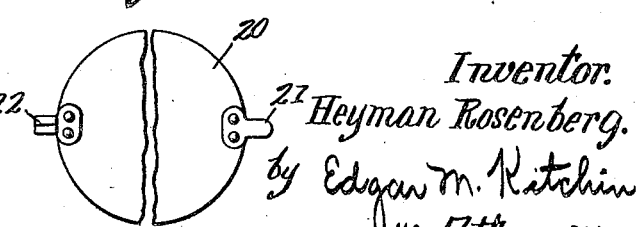
Inventor.
Heyman Rosenberg.
by Edgar M. Kitchin
His Attorney.

UNITED STATES PATENT OFFICE.

HEYMAN ROSENBERG, OF NEW YORK, N. Y.

DAMPER APPARATUS.

1,326,096. Specification of Letters Patent. Patented Dec. 23, 1919.

Application filed May 19, 1919. Serial No. 298,050.

*To all whom it may concern:*

Be it known that I, HEYMAN ROSENBERG, a citizen of the United States, residing at New York, in the county of New York and State of New York, have invented certain new and useful Improvements in Damper Apparatus; and I do hereby declare the following to be a full, clear, and exact description of the invention, such as will enable others skilled in the art to which it appertains to make and use the same.

This invention relates to improvements in damper apparatus, and has as its object the simplifying and increase in efficiency of such apparatus while providing for reduction in expense of construction.

With these and further objects in view, as will in part hereinafter become apparent and in part be stated, the invention comprises certain novel constructions, combinations and arrangements of parts as subsequently specified and claimed.

In the accompanying drawings,—

Figure 1 is a plan view of a quadrant plate forming part of a construction embodying the features of the present invention, the lever and connections being indicated in dotted lines.

Fig. 2 is an edge view thereof with the lever omitted.

Fig. 3 is a vertical central section taken on the plane indicated by line 3—3 of Fig. 1, the lever and connection being shown in position, and parts being seen in elevation.

Figs. 4 and 5 are detail views of the lever detached.

Fig. 6 is a fragmentary plan of a damper plate detached and seen on a reduced scale.

Referring to the drawing by numerals, 1 is a plate of substantially segmental form, marginal parts being cut away for saving of material and improvement in appearance. Thus the plate is formed with a smaller and a larger end. The smaller end portion is provided with outstanding attaching ears 2, 2, having apertures 3 for rivets or retaining means for securing the quadrant plate to a duct. The body of the plate is also formed with an aperture 3' for the same purpose. The smaller end portion of the plate is formed with an outstanding, hollow boss 4, having a central, circular aperture 5, leaving an overhanging flange 6, which is parti-circular, being interrupted at diametrically opposite points by notches 7, 7, designed to permit the passage of an underhanging projection of the handle hereinafter described.

The larger end of plate 1 is formed with a housing 8, which is longitudinally arcuate and transversely substantially rectangular, forming an arcuate passageway 9. The outer face wall of the housing 8 is formed with a longitudinal slot 10 which terminates short of the length of the housing and is of a width sufficiently less than the width of the housing to leave an overhanging flange at each edge of the slot, so that the head 11 of a bolt is adapted to be accommodated within the passageway 9, while the shank 12 of the bolt extends through slot 10, and the bolt is free to be moved edgewise along the slot. The upper wall of the housing 8, at any appropriate point, preferably midway of the length of the housing 8, is formed with an undercut aperture or notch 13, shaped and proportioned to allow the passage of the head 11 through the inner or large portion of such aperture and the shank 12 through the outer or reduced portion thereof for enabling the bolt to be freely introduced into and removed from slot 10 when the bolt is not in engagement with the handle hereinafter described.

An operating handle 14 is arranged with an annular boss 15, projecting laterally from its upper end portion and proportioned to snugly fit within the aperture 5 and to find bearing therein. From one point of the inner portion of boss 15, a finger 16 projects in position for underhanging flange 6, the projection 16 being spaced laterally from the handle 14 a distance sufficient to accommodate the flange 6 between the overlapping portion of the handle on boss 4 and the underlapping projection 16. Handle 14 extends downward from the point of engagement with boss 4 and across housing 8 and at its lower end is formed with an aperture 17 for facilitating the attachment of a tag or other means for indicating the location of the terminus of the duct controlled. At the point above the housing 8, the handle is preferably formed with a strengthening boss and apertured, as at 18, for the accommodation of the bolt 12. Said bolt is provided with a nut 19, preferably of the winged type, for enabling clamping of the handle against housing 8.

Plate 1 is preferably formed with a portion extending below the housing 8, and this portion is divided into sections provided with legends indicative of the condition of the damper within when the handle 14 is over a given legend, as, for example, the plate near one end of slot 10 may bear the word "Shut" and near the other end the word "Open," while the intermediate sections bear the marks ¼, ½ and ¾, respectively.

One of the important advantages of the present invention resides in the fact that the plate 1 may be attached to a duct while no loose part or additional element, other than the plate itself, is connected therewith. This not only has the advantage of facilitating handling, but also leaves the entire internal area of boss 4 open for the accommodation of a bearing projection of a damper, such as indicated in Fig. 6, wherein 20 is the damper plate having the usual pivot projection 21 at one point, and at an opposite point the squared or otherwise polysided projection 22. In practice heretofore it has been customary to rivet the projection 21 in place and then to position the damper within the duct, and afterward to put the projection 22 through the operating lever (arranged on the outside) and then bolt the inner end portion of projection 22 to the damper while within the duct. This is not only expensive but is an awkward and sometimes very difficult operation. By the present invention, this operation is entirely obviated, since the two projections 21 and 22 may be riveted to the damper and the damper then positioned, the damper being permitted to assume the necessary angular position to allow it to be sprung into proper place by virtue of the play permitted while the projection 21 is being moved into and through the boss 4. Such play cannot be had where the projection must pass at once through a closely fitting handle.

In mounting the present improved apparatus, when the plate 1 has been secured to the duct and the damper 20 positioned as just stated, the bolt 12 is placed in the slot 10, and the lever 14 is positioned with its aperture 23 over the projection 22 and the bolt 12 caused to pass through aperture 18. This operation is made possible by virtue of the fact that the lever is applied in a position approximately at right angles to that indicated in dotted lines in Fig. 1, whereby the handle slides freely onto the projection 22 while projection 16 passes through one of the notches 7, and then the lever 14 is swung down into the position for being engaged for bolt 12. There is sufficient play of the parts to allow the lever to be moved over the outstanding end of the bolt 12 until the bolt can pass through aperture 18, and, on such passage of the bolt, the nut 19 is caused to engage the bolt for clamping the handle in any desired adjusted position. Boss 15, from its function, may properly be called a damper-rod-receiving boss.

The slot 10 is not of sufficient length to allow the lever 14 to move angularly sufficiently to enable projection 16 to come into register with either of the notches 7. Thus the parts are effectively locked together and are in condition for operation. Of course, the engagement of bolt 12 with the handle prevents any possible escape of the bolt through the notch or aperture 13.

The relative location of parts has been herein referred to as though the smaller end of the quadrant plate was uppermost as this is its usual location. Variations from this location are in no sense precluded, and this form of reference is used merely for convenience.

What I claim is:—

1. In damper apparatus, the combination of a quadrant plate having means for interlocking with and retaining a damper lever, arranged to enable detachable application of the damper after the plate has been secured to a duct, and a damper lever having a damper-rod-receiving boss adapted to detachably extend into and pivotally engage the plate.

2. In damper apparatus, the combination of a quadrant plate having means for interlocking with and retaining a damper lever arranged to enable detachable application of the damper after the plate has been secured to a duct, and a damper lever having a damper-rod-receiving boss adapted to detachably extend through the plate coaxially with the damper rod and to pivotally engage the plate.

3. In damper apparatus, the combination of a quadrant plate having an aperture and a curved overhanging part adjacent the aperture, a lever having a damper-rod-receiving boss extending into the aperture of the plate and a projection underhanging the curved part, the said curved part terminating in position to enable axial movement of the boss into and out of the aperture when the lever is angularly moved to that degree positioning the projection beyond the end of the curved part, and means for detachably securing the lever against that degree of angular movement.

4. In damper apparatus, the combination of a quadrant plate having an aperture and a curved overhanging part adjacent the aperture, a lever having a damper-rod-receiving boss extending into the aperture of the plate and a projection underhanging the curved part, the said curved part terminating in position to enable axial movement of the boss into and out of the aperture when the lever is angularly moved to that degree positioning the projection beyond the end of the curved part, and a clamping bolt for the handle adjustable across the plate to that limited extent enabling requisite movement of the engaged damper but not to that degree enabling movement of the projection past the curved part.

5. In damper apparatus, the combination of a quadrant plate having an aperture and a curved overhanging part adjacent the aperture, a lever having a damper-rod-receiving boss extending into the aperture of the plate and a projection underhanging the curved part, the said curved part terminating in position to enable axial movement of the boss into and out of the aperture when the lever is angularly moved to that degree positioning the projection beyond the end of the curved part, and the plate being formed with an arcuate slot, and a clamping bolt for the handle extending through and movable along the slot for adjustably securing the handle, the slot being sufficiently limited in length to prevent angular movement to that degree enabling escape of the projection past the curved part.

6. In damper apparatus, the combination of a quadrant plate having a hollow, outstanding boss formed with an aperture in the face of the boss of a size leaving an overhanging flange, the flange being formed with a notch, and a lever having a damper-rod-receiving boss finding bearing in the aperture of the first-mentioned boss and having a projection underhanging the flange of a size proportioned to pass through the notch, the notch being located angularly out of the scope of movement of the projection during the regular operating movements of the lever.

7. In damper apparatus, the combination of a quadrant plate having a hollow outstanding boss at one end portion and an arcuate housing at the other end portion, the boss being formed with an aperture proportioned to leave an overhanging flange and the flange being formed with a notch, the outer surface of the housing being substantially in the same plane as the outer face of the boss, and being formed with a longitudinal slot proportioned to leave overhanging edges, a bolt arranged with its head in the housing in position to underlie the flanges along the slot and with its shank extending through the slot, and a lever having a damper-rod-receiving boss extending into and finding bearing within the aperture in the first-mentioned boss and having a projection underhanging the flange thereof and of a size proportioned to pass through the notch in the flange of the boss when brought into register therewith, the bolt extending through the handle and having a clamping nut for securing the handle at various adjustments along the slot, the slot being located and proportioned for limiting movement of the handle sufficiently for preventing such angular shifting of the damper-rod-receiving boss as would bring its projection into register with the notch in the flange of the hollow boss.

8. In damper apparatus, the combination of a quadrant plate having a hollow, outstanding boss at one end portion and an arcuate housing at the other end portion, the boss being formed with an aperture in its face proportioned to leave an overhanging flange and the flange being formed with a notch, the outer surface of the housing being substantially in the same plane as the outer face of the boss, and being formed with a longitudinal slot proportioned to leave overhanging edges, a bolt arranged with its head in the housing in position to underlie the flanges along the slot and with its shank extending through the slot, and a lever having a damper-rod-receiving boss extending into and finding bearing within the aperture in the face of the first-mentioned boss and having a projection underhanging the flange thereof and of a size proportioned to pass through the notch in the flange of the boss when brought into register therewith, the bolt extending through the handle and having a clamping nut for securing the handle at various adjustments along the slot, the slot being located and proportioned for limiting movement of the handle sufficiently for preventing such angular shifting of the damper-rod-receiving boss as would bring its projection into register with the notch in the flange of the hollow boss, and the housing being formed with an aperture for enabling introduction of the bolt into and removal thereof from the housing while the quadrant plate is operatively fixed to a duct.

9. In damper apparatus, the combination of a quadrant plate having a hollow, outstanding boss at one end portion and an arcuate housing at the other end portion, the boss being formed with an aperture in its face proportioned to leave an overhanging flange and the flange being formed with a notch, the outer surface of the housing being substantially in the same plane as the outer face of the boss and being formed with a longitudinal slot proportioned to leave overhanging edges, a bolt arranged with its head in the housing in position to underlie the flanges along the slot and with its shank extending through the slot, and a lever having a damper-rod-receiving boss extending into and finding bearing within the aperture in the face of the first-mentioned boss and having a projection underhanging the flange thereof and of a size proportioned to pass through the notch in the flange of the boss when brought into register therewith, the bolt extending through the handle and having a clamping nut for securing the handle at various adjustments along the slot, the slot being located and proportioned for limiting movement of the handle sufficiently for preventing such angular shifting of the damper-rod-receiving boss as would bring its projection into register with the notch in the flange of the hollow boss, and the notch in the housing being located out of the path of possible movement of the bolt while the bolt is in engagement with the handle.

In testimony whereof I affix my signature in presence of two witnesses.

HEYMAN ROSENBERG.

Witnesses:
SIMON L. MUENZER,
J. E. LULLER.